United States Patent [19]
Hirai et al.

[11] 3,986,164
[45] Oct. 12, 1976

[54] BRAKE ASSEMBLY WEAR DETECTOR

[75] Inventors: Akiyoshi Hirai; Masakazu Ishikawa; Sadayoshi Ito, all of Toyota; Takeshi Noguchi, Itami, all of Japan

[73] Assignees: Toyota Jidosha Kogyo Kabushiki Kaisha; Sumitomo Denki Kogyo K.K., both of Japan

[22] Filed: Aug. 26, 1974

[21] Appl. No.: 500,681

[30] Foreign Application Priority Data
Aug. 29, 1973 Japan................. 48-100633[U]

[52] U.S. Cl.............................. 340/52 A; 200/61.4; 188/1 A
[51] Int. Cl.²................... B60T 17/22; F16D 66/02
[58] Field of Search............... 340/52 A; 200/61.4, 200/61.44; 188/1 A

[56] References Cited
UNITED STATES PATENTS

| | | |
|---|---|---|
| 3,556,258 | 1/1971 | Winge et al............................ 188/1 |
| 3,611,283 | 10/1971 | Anders et al. ..................... 340/52 A |
| 3,716,113 | 2/1973 | Kobayashi et al. ............... 340/52 A |
| 3,783,979 | 1/1974 | Hess................................... 188/1 A |

*Primary Examiner*—John W. Caldwell
*Assistant Examiner*—Joseph E. Nowicki
*Attorney, Agent, or Firm*—Toren, McGeady and Stanger

[57] ABSTRACT

A warning mechanism for detecting brake shoe wear is adapted to be fitted into a recess formed on the rear face of a brake shoe such that when the front face of the shoe, which undergoes frictional engagement during braking, is worn to a sufficient extent, a defaceable detection wire in the warning mechanism will be ruptured to provide an indication of depletion of the braking material of the shoe. The detector element is removably secured within the recess of the brake shoe and is located such that it will not be dislodged by a braking force applied to the brake shoe by a piston of the brake assembly but will, instead, be held in position thereby.

7 Claims, 6 Drawing Figures

BRAKE ASSEMBLY WEAR DETECTOR

BACKGROUND OF THE INVENTION

The present invention relates generally to vehicle braking devices and more particularly to a warning mechanism for detecting wear in the brake shoe of a vehicle wheel braking assembly. The invention relates to a type of warning mechanism wherein a defaceable electrical circuit element such as a conductor wire is arranged to trigger a warning signal when depletion of the frictional brake shoe material has progressed beyond a predetermined limit.

In certain brake shoe wear warning devices of the type to which the present invention relates, a detection element for detecting the condition of wear of the brake frictional material in a brake assembly is provided behind the frictional material so that when wear of the friction material advances beyond a predetermined working limit, the warning device is electrically triggered to generate a signal notifying the occurrence of such excess wear. As a result, notification of the need to replace the brake friction material is acquired thereby preventing further deterioration of the brake performance, generation of undesirable braking noises and abnormal frictional heat.

In accordance with such known devices, however, the detection element is integrally incorporated in the brake friction material and cannot be readily separated therefrom. Accordingly, when trouble arises in the detection element, as for example would occur when the detection element malfunctions and produces a signal prematurely without the required amount of wear having occurred, it becomes necessary to replace extensive portions of the assembly including the frictional material and the detection element. Similarly, if problems should arise with regard to the brake friction material such as noise generation or improper braking effects, it again becomes necessary to replace both the brake friction material and the detection element even though only one of them may require replacement.

Moreover, when the wiring which is connected to the detection element becomes damaged, the brake friction material which is working normally must also be replaced together with the detection element. It will be apparent that the foregoing factors create disadvantages involving uneconomical utilization of braking elements.

The present invention is intended to overcome these problems by providing a warning mechanism having a detection element which is effective to indicate excessive brake shoe wear and which may be detachably mounted upon the brake shoe in cooperative engagement with the brake shoe friction material.

SUMMARY OF THE INVENTION

Briefly, the present invention may be described as a warning mechanism for detecting brake shoe wear in a wheel braking assembly including a brake shoe having a first side and a second side, a rotatable disc fixed to said wheel and positioned to be frictionally engaged by the first side of said brake shoe, and piston means disposed to contact the second side of the brake shoe to apply a braking force thereto. The warning mechanism of the invention comprises means defining a recess in the second side of the brake shoe at a part thereof which would be normally contacted by the piston means. The recess extends from the second side partially through the brake shoe into the friction material of the shoe and terminates a distance from the first side of the shoe which contacts the rotatable disc. A defaceable detection element is removably fitted in the recess and is adapted to be held in place by operation of the piston means against the second side of the brake shoe. A warning signal generating device is connected with the detection element and is adapted to produce a warning signal indicating brake shoe wear when frictional material on the first side of the brake shoe has been worn down by an amount exceeding workable limits. When this occurs, the detection element will be caused to contact the rotatable disc thereby triggering the warning device.

The key features of the invention reside in the fact that the defaceable detection element may be removably fitted within the recess in the brake shoe so that either the brake shoe or the detection element may be separately replaced without requiring replacement of both. Furthermore, the warning mechanism is so arranged that the operation of the piston means applying the braking force may be also utilized to maintain the detection element in place.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

DETAILED DESCRIPTION OF THE PREFERRED EMBODIMENT

Figure 1:
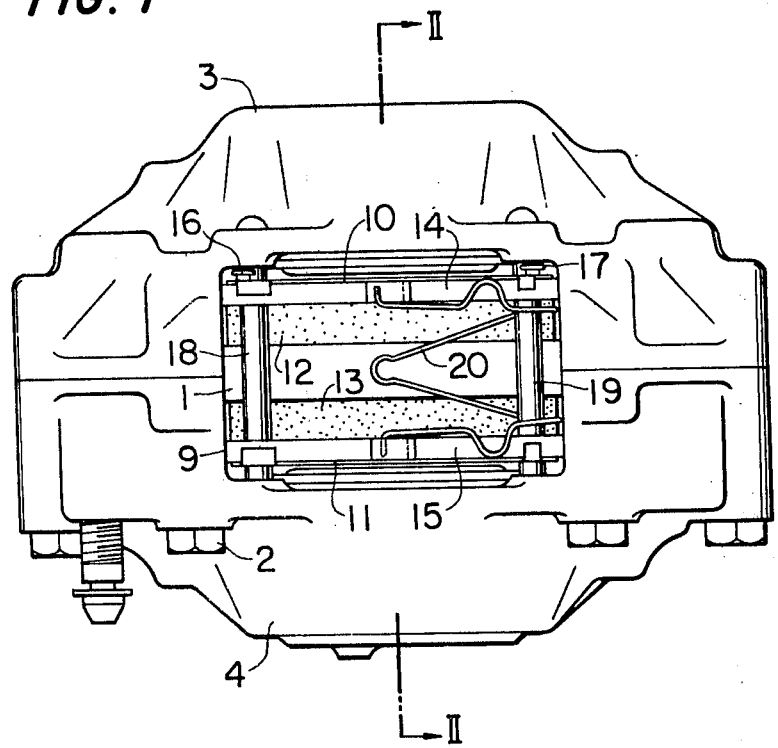
FIG. 1 is a plan view of a disc brake assembly incorporating a brake shoe wear warning device in accordance with the present invention.
Figure 2:
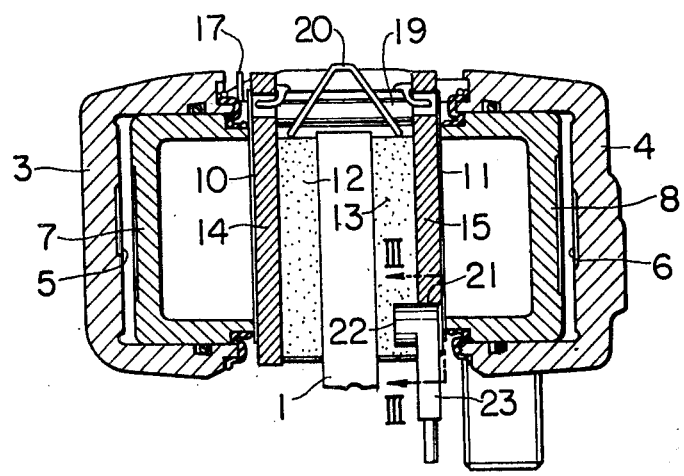
FIG. 2 is a sectional view taken along the line II—II of FIG. 1.
Figure 3:
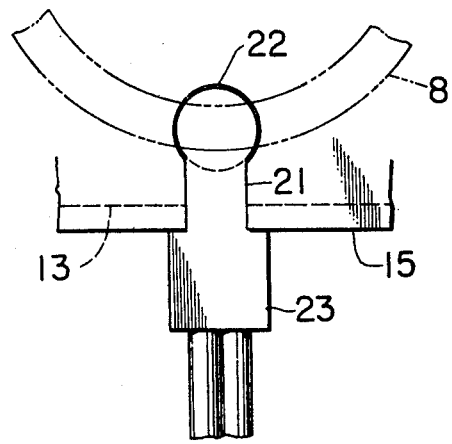
FIG. 3 is a sectional view taken along the line III—III of FIG. 2.

Referring now to the drawings, and more particularly to FIGS. 1–3 thereof, there is shown a disc brake assembly including an inner caliper 3 and an outer caliper 4 joined together by bolts 2 and mounted over a part of a disc 1 which is fixed to rotate with a wheel (not shown) to be braked by the assembly. Provided in the inner and outer calipers 3 and 4 are cylinders 5 and 6 arranged to operate in opposed directions. A pair of sealed pistons 7 and 8 are inserted, respectively, into the cylinders 5 and 6 and are mounted to be movable toward the disc 1 under the force of applied brake oil pressure. Above the calipers 3 and 4 there is provided a square opening 9 accommodating removal and replacement of portions of the brake assembly.

The assembly includes a pair of brake shoes including, respectively, back metal pads 14 and 15 each provided with shims 10, 11 and frictional material brake pads 12 and 13. The brake shoes are inserted through the opening 9 so that they may be positioned between opposite sides of the disc 1 and the pistons 7 and 8, respectively. The shims 10, 11 and the back metal pads 14, 15 are movably secured to the respective calipers 3, 4 by means of pins 18, 19 fixed in position by clips 16, 17 respectively. Between the pads 12, 13 and the back metal pads 14, 15 and one of the pins 19 there is provided an M-spring 20 adapted to retain the brake shoes in position.

Accordingly, when brake oil is applied to the cylinders 5, 6 the pistons 7, 8 are forced to move by the developed oil pressure to press the pads 12, 13 against the disc 1 so as to develop a braking force by frictional contact between the disc 1 and the pads 12, 13 thereby to brake the disc 1 and the wheel to which it is affixed.

In accordance with the device of the present invention, a brake shoe recess is formed on the rear side of the brake shoe with said recess being defined by a through-hole 21 extending through the back metal pad 15 and by a brake pad recess 22 extending partially through the frictional material of the brake pad 13. The recess is located in the central underside part of the back metal pad 15 at a location which is normally in contact with the piston 8 of the disc brake assembly. The brake pad recess formed in the pad 13 is located at a position in alignment with the hole 21 and the recess 22 is formed with a depth sufficient to allow insertion therein of a detection element 23. It will be noted that the recess 22 terminates at a distance spaced from the side of the brake pad 13 which engages the disc 1.

Figure 4A:
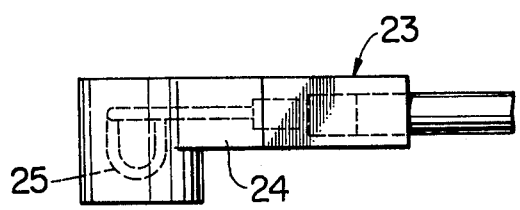
FIGS. 4a and 4b are a front view and a plan view, respectively, of a detection element according to the present invention.
Figure 4B:
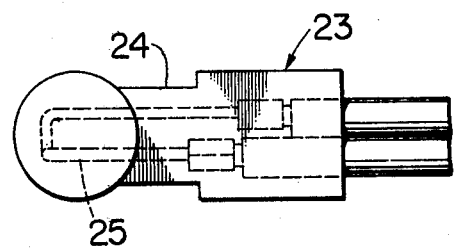

As shown in FIGS. 4a and 4b, the detection element 23 comprises a body portion 24 which is made of a defaceable resinous insulating material such as epoxy resin with the body 24 being formed in a bent or generally L-shaped at one end thereof. Embedded within the body 24 is a defaceable wire conductor element 25 which is formed with a loop having a part thereof projected at right angles along the bent end portion of the body 24 so that the body 24 may be broken or cut away at this portion.

When setting the detection element 23 in position within the disc brake assembly, the body 24 is removably fitted within the hole 21 in the back metal pad 15 and in the recess 22 in the pad 13 in contact with the shim 11 and it is secured in position in such a manner that it will not be dislocated by the pressing force of the piston 8, as shown in FIG. 2.

It is to be noted that if the projecting portion of the wire element is so positioned that the part to be broken away is directed in the direction of rotation of the disc 1, the wire element may slip aside making it unable to effect positive cutting at the correct said position thereby causing a delay in the issuance of a warning signal, so that even when fitting the detection element 23 in the tangential direction, let alone in its radial direction, the portion of the bare wire element to be cut must be disposed transversely to the direction of rotation of the disc 1.

Figure 5:
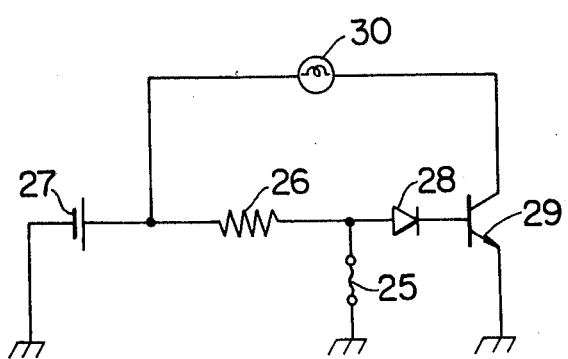
FIG. 5 is a circuit diagram of the electrical warning signal generating device of the present invention.

The wire element 25 of the detection element 23 is grounded at one end and is connected at its other end to a battery 27 through a resistance 26 with a connection also being made to the base of a transistor 29 for switching through a diode 28. A warning lamp 30 is connected between the battery 27 and the collector of the transistor 29, as shown in FIG. 5.

As a result of repeated braking action, the pads 12, 13 will gradually wear down due to their frictional engagement with the disc 1, and when the degree of such wear becomes excessive and exceeds a working limit, a part of the body portion 24 of the detection element 23 will be severed by contact with the disc 1 thereby causing breakage of the wire element 25. Thereupon, the circuit portion defined by the element 25 will be broken and current flow therethrough will be terminated. As a result, the connection of the base of the transistor 29 to ground will be broken and the battery 27 will cause a signal to be applied to the base of the transistor 29 causing current flow between the base and the emitter thereof thereby rendering the transistor 29 conductive. As a result, current will also flow between the collector and the emitter of the transistor 29 and through the warning lamp 30 to cause the lamp to generate a blinking signal.

When it is desired to replace the detection element 23 along with the pads 12, 13 which have been worn down beyond their working limit, the clips 16 and 17 are first removed to enable removal of the pins 18, 19 with the spring 20 being subsequently removed. Thus, the back metal pads 14, 15 having the brake pads 12, 13 secured thereto as well as the shims 10, 11 may be removed through the opening 9 followed by removal of the detection element 23 between the back metal pad 15 and the pad 13. After thus removing the pads 12, 13 and the detection element 23, new pads and a new detection element are fitted into position by a procedure which is the reverse of the above-described removal procedure, thereby completing the desired replacement of the elements to restore the assembly to normal condition. An identical procedure is repeated when it is required to replace the newly fitted pads 12, 13 and the detection element 23.

Thus, according to the present invention, the pads 13 and the detection element 23 are assembled such that they are separable from each other, so that when it is necessary to replace one of them due to some malfunction, it is possible to remove both the pad 13 and the detection element 23 and to replace only the one that is defective. This results in a highly economical assembly since there is no need to replace both the pad 13 and the detection element 23 when only one becomes defective or inoperative. Also, since the detection element 23 is removed together with the pad 13, replacement of the detection element 23, when so desired, can be accomplished as easily as replacing the pad 13. Furthermore, should the detection element 23 come into contact directly with the disc 1 due to excess wear of the pad 13, there is no possibility that the detection element 23 will slip off and be dragged between the disc 1 and other parts of the assembly. Moreover, since the detection element 23 is fixed in a recess formed on the rear side of the brake shoe comprising the pad 13 on a side opposite from its friction surface, there does not occur any reduction in the area of frictional braking engagement of the pad 13 which would otherwise lessen the braking performance of the disc 1.

It is to be understood that although the present invention has been described as adapted within a disc brake assembly, it may, of course, be utilized as effectively by application to a drum brake assembly. Additionally, the detection element 23 may just as easily be assembled in combination with the opposite brake shoe comprising the pad 12.

While a specific embodiment of the invention has been shown and described in detail to illustrate the application of the invention principles, it will be understood that the invention may be embodied otherwise without departing from such principles.

What is claimed is:

1. A warning mechanism for detecting brake shoe wear in a wheel braking assembly including a brake shoe having a first side and a second side, a rotatable disc fixed relative to said wheel and positioned to be frictionally engaged by said first side of said brake shoe, piston means disposed to apply a braking force against said second side of said brake shoe and shim means interposed between said piston means and said second side of said brake shoe, said warning mechanism comprising means defining a recess in said second side of said brake shoe at a part of said second side normally contacted by said piston, said recess extending from said second side partially through said brake shoe and terminating a distance from said first side, a defaceable detection element removable fitted in said recess and held in place by said piston means, said shim means extending over said detection element between said piston means and said detection element with the braking force applied by said piston means being directed to bear against said detection element in the direction toward said disc to hold said removably fitted detection element in place within said recess to prevent displacement thereof during operation of said braking assembly, said detection element being removable from said recess by withdrawal therefrom out of said recess from said second side of said brake shoe when replacement of said brake shoe or of said detection element is desired, said detection element including a portion thereof extending from said second side of said brake shoe toward said disc in a direction generally transversely to the direction of rotation of said disc, and a warning signal generating device connected with said detection element and adapted to produce a warning signal indicating brake shoe wear when the first side of said brake shoe has been worn down by an amount sufficient to cause breakage of said detection element by contact of said detection element with said rotatable disc.

2. A mechanism according to claim 1 wherein said warning signal generating device and said detection element are comprised of an electrical circuit operable to generate a signal indicating brake shoe wear upon breakage of said detection element.

3. A mechanism according to claim 2 wherein said detection element includes a defaceable conductor wire connected as part of said electrical circuit.

4. A mechanism according to claim 3 wherein said detection element includes a body portion composed of defaceable electrically insulating resinous plastic material having said conductor wire embedded therein.

5. A mechanism according to claim 4 wherein said detection element body portion is formed in a generally L-shaped configuration having one leg thereof extending from said second side of said brake shoe toward said first side thereof.

6. A mechanism according to claim 4 wherein said recess defined in said brake shoe is formed with a configuration generally coinciding with the configuration of said detection element body portion to prevent displacement of said detection element relative to said brake shoe in directions extending transversely of the direction of the braking force applied by said piston means.

7. A mechanism according to claim 1 wherein said brake shoe comprises brake friction material located on said first side thereof and adapted to be pressed against said rotatable disc in the development of a braking force, and a retaining member located on said second side thereof for retaining said brake friction material in place, and wherein said brake shoe recess is defined by a hole extending through said retaining member and a recess formed in said friction material at a position aligned with said hole.

* * * * *